United States Patent [19]

Yoshida et al.

[11] Patent Number: 4,626,934
[45] Date of Patent: Dec. 2, 1986

[54] CUE SIGNAL RECORDING CIRCUIT FOR MAGNETIC RECORDING AND REPRODUCING APPARATUS

[75] Inventors: Masajhi Yoshida, Yokohama; Akira Hirota, Chigasaki; Yoshihiko Ota; Masahiko Tsuruta, both of Yokohama; Hidetoshi Ozaki, Chofu, all of Japan

[73] Assignee: Victor Company of Japan, Ltd., Kanagawa, Japan

[21] Appl. No.: 692,644

[22] Filed: Jan. 16, 1985

[30] Foreign Application Priority Data

Jan. 19, 1984 [JP] Japan .................................. 59-7834

[51] Int. Cl.[4] .................. G11B 5/03; G11B 5/09
[52] U.S. Cl. ....................................... 360/66; 360/46
[58] Field of Search ................ 360/40, 66, 72.1, 72.2, 360/68, 46

[56] References Cited

U.S. PATENT DOCUMENTS

| 2,894,796 | 7/1959 | Reynolds | 360/68 |
| 4,244,009 | 1/1981 | Satoh | 360/68 |
| 4,470,085 | 9/1984 | Kanayama | 360/72.1 |

FOREIGN PATENT DOCUMENTS

| 810435 | 8/1951 | Fed. Rep. of Germany . |
| 1916492 | 10/1969 | Fed. Rep. of Germany . |
| 2354367 | 5/1974 | Fed. Rep. of Germany . |
| 2537986 | 3/1976 | Fed. Rep. of Germany . |
| 541850 | 9/1973 | Switzerland . |

Primary Examiner—Vincent P. Canney
Attorney, Agent, or Firm—Ladas & Parry

[57] ABSTRACT

A cue signal recording circuit for a magnetic recording and reproducing apparatus comprises an erase signal generator for generating an erase signal having a relatively high frequency, a symmetry varying circuit responsive to a first external signal having a relatively low frequency for varying the symmetry of the waveform of the output erase signal of the erase signal generator at the relatively low frequency, a switch having a first input terminal applied with the output erase signal of the erase signal generator and a second input terminal applied with an output signal of the symmetry varying circuit, where the switch is connected to the second input terminal so as to pass the output signal of the symmetry varying circuit for a predetermined short time period and is thereafter connected to the first input terminal so as to pass the output erase signal of the erase signal generator responsive to a second external signal, and an erase head supplied with the output signal of the switching for recording on a magnetic tape a signal having the relatively low frequency as a cue signal for the predetermined short time period and thereafter erasing pre-recorded signals on the magnetic tape.

7 Claims, 4 Drawing Figures

CUE SIGNAL RECORDING CIRCUIT FOR MAGNETIC RECORDING AND REPRODUCING APPARATUS

BACKGROUND OF THE INVENTION

The present invention generally relates to cue signal recording circuits for magnetic recording and reproducing apparatuses, and more particularly to a cue signal recording circuit for a magnetic recording and reproducing apparatus which records a cue signal on a magnetic tape by an erase head at the start of a recording so that the beginning of a desired pre-recorded program on the magnetic tape can be found by reproducing the pre-recorded cue signal from the magnetic tape during a cue mode, which cue signal recording circuit has a simple construction and can be manufactured at a low cost.

In a magnetic recording and reproducing apparatus such as a video tape recorder (hereinafter simply referred to as a VTR), the operator often wishes to find the beginning of a desired pre-recorded program on a magnetic tape (hereinafter simply referred to as a tape) which is recorded with a plurality of programs. However, it will be too troublesome and time consuming to search for the beginning of the desired pre-recorded program while monitoring the reproduced picture as the tape is moved at a speed which is the same as the speed with which the programs were recorded on the tape at the time of the recording. But if a cue signal is recorded on the tape at the beginnings of the programs, it is possible to find the desired pre-recorded program within a short time period by detecting the pre-recorded cue signal as the tape is moved at a speed which is higher than the speed with which the programs were recorded on the tape. A VTR which records such a cue signal on the tape comprises a cue signal recording circuit. At the start of a recording, the cue signal recording circuit of the VTR records the cue signal on the tape by an erase head at the beginning of a program, and the beginning of the desired pre-recorded program is found by reproducing the pre-recorded cue signal from the tape during a cue mode. During a cue mode, the tape is moved in a forward direction (fast-forward cue mode) or a reverse direction (rewind cue mode) at a speed which is higher than the speed with which the programs are recorded on the tape.

As an example of a conventional cue signal recording circuit, there is a cue signal recording circuit generally comprising an erase signal generator, a cue signal generator, a coupling capacitor, and a switch. According to this conventional cue signal recording circuit, the erase signal generator generates an erase signal having a frequency of 70 kHz, for example, and supplies the erase signal to a first input terminal of the switch. The cue signal generator generates a cue signal having a frequency of 30 Hz, for example, and supplies the cue signal to a second input terminal of the switch through the coupling capacitor. The switching of the switch is controlled responsive to a control signal applied to a third input terminal of the switch. The control signal is generated in a control signal generating circuit which is responsive to an output of a recording start button which is manipulated at the start of the recording. For example, the control signal controls the switch so that the switch selectively passes the cue signal supplied to the second input terminal thereof for approximately one second and thereafter passes the erase signal supplied to the first input terminal thereof. The output of the switch is supplied to an erase head. Since the erase head is supplied with the cue signal for approximately one second from the start of the recording and is thereafter supplied with the erase signal, the erase head records the cue signal on the tape for approximately one second from the start of the recording and thereafter erases pre-recorded signals on the tape. According to the conventional cue signal recording circuit, the cue signal is recorded on the tape at the beginning of each of the programs, and for this reason, it is possible to find the beginning of the pre-recorded programs by reproducing the pre-recorded cue signal from the tape during the fast-forward cue mode or the rewind cue mode of the VTR.

However, the erase signal generated by the erase signal generator of the conventional cue signal recording circuit, is a signal having a large level of 50 volts peak-to-peak, for example. Accordingly, a simple semiconductor electronic switch cannot be used for the switch which selectively passes the erase signal or the cue signal, and it is necessary to use a relay switch for this switch. In addition, the coupling capacitor must have a large capacitance in the order of 47 $\mu$F, for example, because the cue signal generated by the cue signal generator has a low frequency. Further, the conventional cue signal recording circuit is disadvantageous in that the circuit construction is complex due to the provision of the erase signal generator and the cue signal generator which are completely independent circuits.

SUMMARY OF THE INVENTION

Accordingly, it is a general object of the present invention to provide a novel and useful cue signal recording circuit for a magnetic recording and reproducing apparatus, in which the disadvantages described heretofore are eliminated.

Another and more specific object of the present invention is to provide a cue signal recording circuit for a magnetic recording and reproducing apparatus, which cue signal recording circuit generally comprises an erase signal generator, a symmetry varying circuit, and a switch. The erase signal generator generates an erase signal having a frequency in the range of 50 kHz to 100 kHz, for example, and supplies the erase signal to a first input terminal of the switch. The symmetry varying circuit varies the symmetry of the waveform of the erase signal from the erase signal generator, at a low frequency in the range of 20 Hz to 40 Hz, for example, and supplies an output signal to a second input terminal of the switch. The switching of the switch is controlled responsive to a control signal which is generated in a control signal generating circuit which is responsive to an output of a recording start button which is manipulated at the start of the recording. For example, the control signal controls the switch so that the switch selectively passes the cue signal supplied to the second input terminal thereof for approximately one second and thereafter passes the erase signal supplied to the first input terminal thereof. The output of the switch is supplied to an erase head, and the erase head records the cue signal on a magnetic tape for approximately one second from the start of the recording and thereafter erases pre-recorded signals on the tape. Because the symmetry of the waveform of the erase signal having a frequency of 70 kHz, for example, varies at a frequency of 30 Hz, for example, the erase head records on the tape a cue signal having a frequency of 30 Hz for approximately one second from the start of the recording.

According to the cue signal recording circuit of the present invention, a simple digital switch may be used for the switch. In addition, the circuit construction of the cue signal recording circuit is simple because the cue signal is substantially formed from the output erase signal of the erase signal generator. Further, it is unnecessary to use a coupling capacitor having a large capacitance as in the case of the conventional cue signal recording circuit described before. Moveover, the erase signal generator, the symmetry varying circuit, and the switch may be constituted by inexpensive digital circuits, and it is possible to manufacture the cue signal recording circuit in the form of an integrated circuit and the cue signal recording circuit can be manufactured at a low cost.

Other objects and further features of the present invention will be apparent from the following detailed description when read in conjunction with the accompanying drawings.

DETAILED DESCRIPTION

Figure 1:
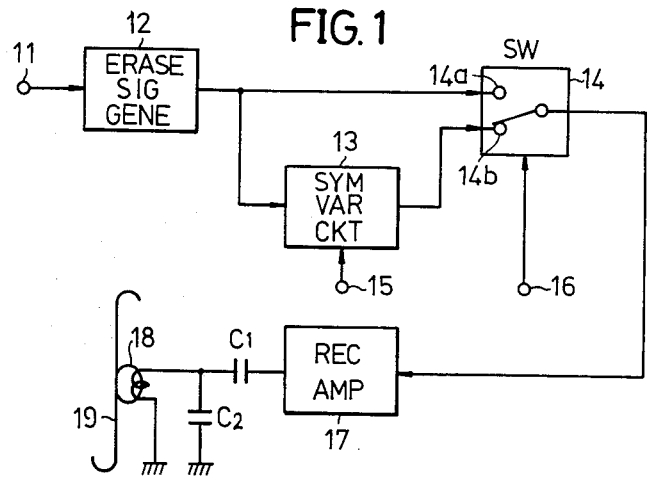
FIG. 1 is a schematic block diagram showing an embodiment of a cue signal recording circuit according to the present invention.

In FIG. 1, a signal having a frequency of 1.12 MHz, for example, is applied to an input terminal 11. For example, this signal may be obtained by frequency-dividing an output signal of an oscillator (not shown) within a magnetic recording and reproducing apparatus (hereinafter simply referred to as a VTR), or may be obtained from an oscillator (not shown) which is provided exclusively for generating this signal. The signal from the input terminal 11 is supplied to an erase signal generator 12 wherein the signal converted into an erase signal having a frequency in the range of 50 kHz to 100 kHz, and the erase signal is applied to an input terminal 14a of a switch 14. In the present embodiment, the erase signal has a frequency of 70 kHz, for example. The output erase signal of the erase signal generator 12 is also supplied to a symmetry varying circuit 13. The symmetry varying circuit 13 receives from a terminal 15 a signal having a low frequency in the range of 20 Hz to 40 Hz. In the present embodiment, the signal from the terminal 15 has a frequency of 30 Hz, for example. The symmetry varying circuit 13 produces a signal having such a waveform that the symmetry of the waveform of the erase signal having the frequency of 70 kHz varies at a frequency of 30 Hz. This output signal of the symmetry varying circuit 13 is applied to an input terminal 14b of the switch 14. For example, the signal applied to the terminal 15 is obtained from a known drum servo circuit (not shown) or a capstan servo circuit (not shown) within the VTR.

The switching of the switch 14 is controlled responsive to a control signal applied to a terminal 16. The control signal is generated in a control signal generating circuit (not shown) which is within the VTR and is responsive to an output of a recording start button (not shown) of the VTR. The recording start button is manipulated at the start of the recording. The control signal connects the switch 14 to the terminal 14b for approximately one second, for example, from the time when the recording start button is manipulated. Thereafter, that is, after approximately one second elapses from the start of the recording, the control signal connects the switch 14 to the terminal 14a. Accordingly, the switch 14 passes the output signal of the symmetry varying circuit 13 for approximately one second from the start of the recording, and thereafter passes the output erase signal of the erase signal generator 12. The output signal of the switch 14 is supplied to an erase head 18, through a recording amplifier 17 and a capacitor $C_1$. A capacitor $C_2$ is coupled between ground and a connection point between the capacitor $C_1$ and the erase head 18. The erase head 18 makes contact with a magnetic tape 19 throughout the entire width of the tape 19.

During approximately one second from the start of the recording, that is, during approximately one second from the time when the recording start button is manipulated, the erase head 18 receives through the recording amplifier 17 and the capacitor $C_1$ the output signal of the symmetry varying circuit 13 obtained from the terminal 14b of the switch 14. But as described before, the output signal of the symmetry varying circuit 13 has such a waveform that the symmetry of the waveform of the erase signal having the frequency of 70 kHz varies at the frequency of 30 Hz. As a result, the erase head 18 only records on the tape 19 a cue signal having a frequency of 30 Hz during the approximately one second from the start of the recording. After approximately one second elapses from the start of the recording, the erase head 18 receives through the recording amplifier 17 and the capacitor $C_1$ the output erase signal of the erase signal generator 12 obtained from the terminal 14a of the switch 14. Hence, after approximately one second elapses from the start of the recording, the erase head 18 erases pre-recorded signals on the tape 19.

Figure 2:
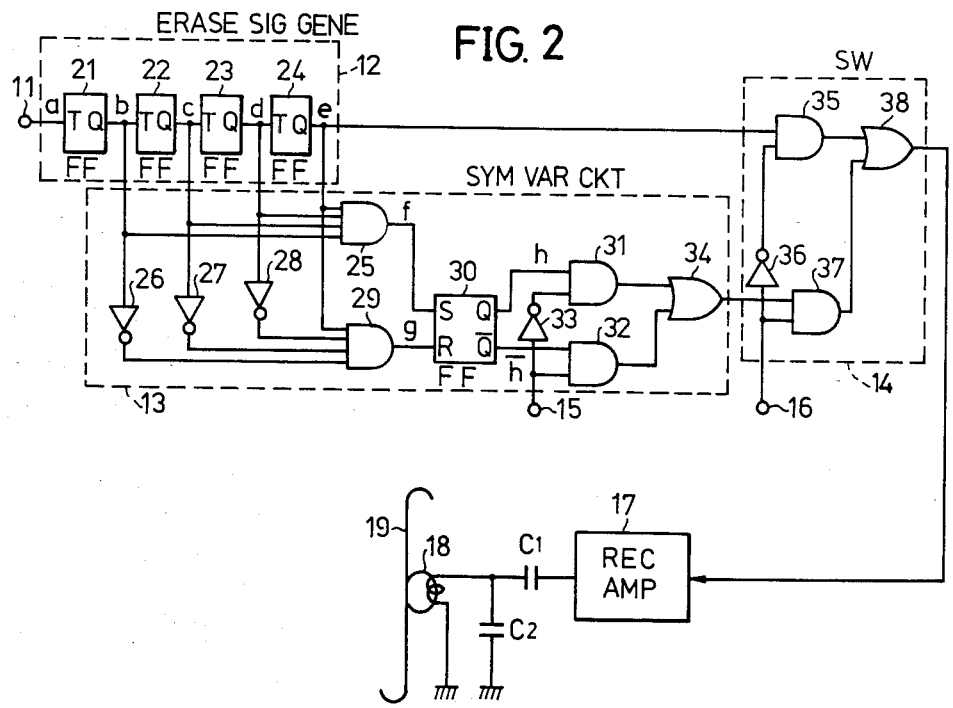
FIG. 2 is a circuit diagram showing an embodiment of a concrete circuit of the block system shown in FIG. 1.
Figure 3:
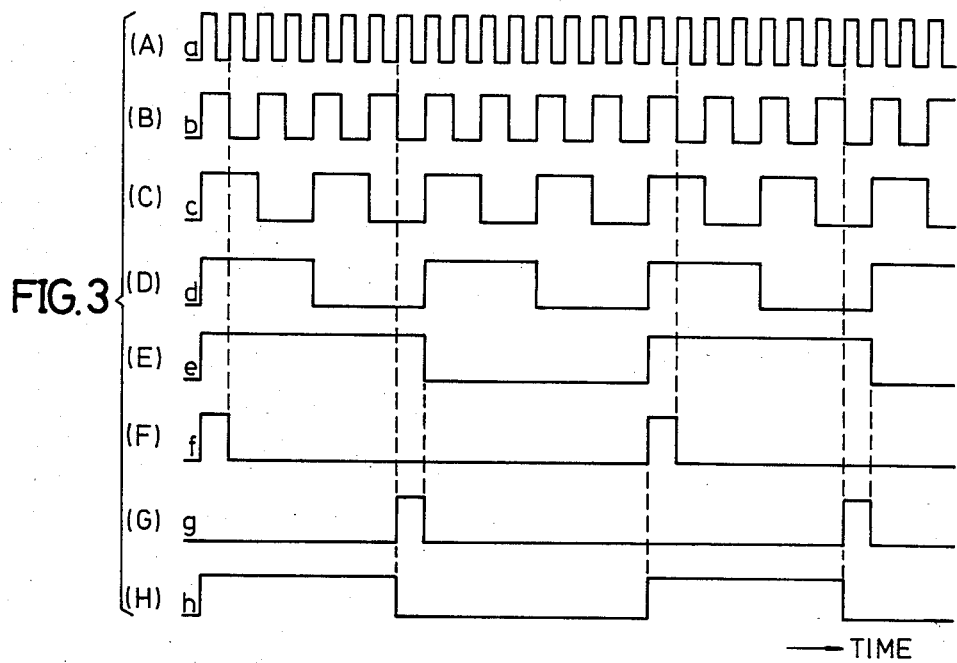
FIGS.3(A) through 3(H) shows signal waveforms at parts of the circuit shown in FIG. 2.

Next, a description will be given with respect to an embodiment of a concrete circuit of the block system shown in FIG. 1, by referring to FIGS.2 and 3. In FIG. 2, those parts which are the same as those corresponding parts in FIG. 1 are designated by the same reference numerals, and their description will be omitted.

In FIG. 2, the erase signal generator 12 comprises trigger type flip-flops 21 through 24 which are coupled in series. A pulse signal a shown in FIG. 3(A) having a repetition frequency of 1.12 MHz, for example, is applied to the input terminal 11. The pulse signal a is applied to a trigger terminal T of the flip-flop 21 and is frequency-divided by ½ into a pulse signal b shown in FIG. 3(B). The pulse signal b obtained from a Q-output terminal of the flip-flop 21 is applied to a trigger input terminal T of the flip-flop 22 and is frequency-divided by ½ into a pulse signal c shown in FIG. 3(C). Similarly, the pulse signal c obtained from a Q-output terminal of the flip-flop 22 is successively passed through the flip-flops 23 and 24 and is successively frequency-divided by ½. Thus, a pulse signal d shown in FIG. 3(D) is obtained from a Q-output terminal of the flip-flop 23, and a pulse signal e shown in FIG. 3(E) is obtained from a Q-output terminal of the flip-flop 24. The pulse signal e has a repetition frequency of 70 kHz, for example, and is supplied as the erase signal to one input terminal of a 2-input AND circuit 35 within the switch 14.

The symmetry varying circuit 13 comprises AND circuits 25, 29, 31, and 32, inverters 26, 27, and 28, a set-and-reset (S-R) type flip-flop 30, and an OR circuit 34. The pulse signals b, c, d, and e from the erase signal generator 12 are supplied to the 4-input AND circuit 25, and the AND circuit 25 produces a pulse signal f shown in FIG. 3(F). On the other hand, the pulse signals b, c, and d are passed through the corresponding inverters 26, 27, and 28 and are supplied to the 4-input AND circuit 29. The pulse signal (erase signal) e is supplied directly to the AND circuit 29. Accordingly, the AND circuit 29 produces a pulse signal g shown in FIG. 3(G).

The pulse signal f is applied to a set terminal S of the flip-flop 30, and the pulse signal g is applied to a reset terminal R of the flip-flop 30. Hence, a pulse signal h shown in FIG. 3(H) having a repetition frequency of 70 kHz and a duty factor of approximately 44% is obtained from a Q-output terminal of the flip-flop 30. On the other hand, a pulse signal $\bar{h}$ having the inverted waveform of the pulse signal $h$ and having a duty factor of approximately 56% is obtained from a $\bar{Q}$-output terminal of the flip-flop 30. The pulse signal $\underline{h}$ is applied to one input terminal of the 2-input AND circuit 31, and the pulse signal $\bar{h}$ is applied to one input terminal of the 2-input AND circuit 32.

A reference pulse signal having a repetition frequency of 30 Hz and having a duty factor of 50%, for example, is applied to the terminal 15. For example, the reference pulse signal applied to the terminal 15 is obtained from a known drum servo circuit (not shown) within the VTR. The reference pulse signal is passed through the inverter 33 and is applied to the other input terminal of the AND circuit 31. In addition, the reference pulse signal is applied directly to the other input terminal of the AND circuit 32. Accordingly, the AND circuit 31 produces the pulse signal h during a low-level period of the reference pulse signal, and the AND circuit 32 produces the pulse signal $\bar{h}$ during a high-level period of the reference pulse signal. The output signals of the AND circuits 31 and 32 are supplied to the OR circuit 34. As a result, the OR circuit 34 produces a signal in which the pulse signal h and the pulse signal $\bar{h}$ alternately appears with the frequency of 30 Hz, that is, alternately appears for approximately every 17 seconds. The output signal of the OR circuit 34 is applied to one input terminal of a 2-input AND circuit 37 within the switch 14.

The control signal applied to the terminal 16 is generated in a control signal generating circuit (not shown) which is within the VTR and is responsive to an output of a recording start button (not shown) of the VTR. For example, the control signal assumes a high level for approximately one second from the start of the recording and thereafter assumes a low level. The switch 14 comprises the AND circuits 35 and 37, an inverter 36, and an OR circuit 38. The control signal is directly applied to the other input terminal and the AND circuit 37. In addition, the control signal is passed through the inverter 36 and is applied to the other input terminal of the AND circuit 35. Output signals of the AND circuits 35 and 37 are supplied to the OR circuit 38. Thus, the output signal of the AND circuit 37 is obtained through the OR circuit 38 for approximately one second from the start of the recording. But after approximately one second elapses from the start of the recording, the output erase signal of the AND circuit 35 is obtained through the OR circuit 38. The output signal of the OR circuit 38, that is, the output signal of the switch 14, is amplified in the recording amplifier 17 which has a characteristic for eliminating harmonic components included in the output signal of the switch 14 so as not to affect the recording of a video signal, for example. The output signal of the recording amplifier 17 is supplied to the erase head 18 through the capacitor $C_1$.

At the time of the recording, the tape 19 moves at a relatively slow speed with respect to the erase head 18. For this reason, only the low-frequency signal component (cue signal) of 30 Hz is recorded on the tape 19 for approximately one second from the start of the recording. After approximately one second elapses from the start of the recording, the switch 14 passes the erase signal e, and the erase head 18 thus erases the pre-recorded signals on the tape 19.

The waveform of the pulse signal h obtained from the Q-output terminal of the flip-flop 30 is not limited to the waveform shown in FIG. 3(H). The pulse signal h simply needs to have a repetition frequency which is approximately equal to that of the erase signal e and have a duty factor other than 50%. Further, the waveform of the pulse signal $\bar{h}$ is not limited to the inverted waveform of the pulse signal h shown in FIG. 3(H). The pulse signal $\bar{h}$ simply needs to have a repetition frequency which is approximately equal to that of the erase signal e and have a duty factor different from the duty factor of the pulse signal $\underline{h}$.

Moreover, the time period in which the switch 14 is controlled to pass the output signal of the symmetry varying circuit 13 is not limited to approximately one second. The time period in which the switch 14 passes the output signal of the symmetry varying circuit 13 simply needs to be set to a short time period which is short so that the recording of the actual program is substantially not delayed but is sufficiently long so as to enable the pre-recorded cue signal to be reproduced from the tape during the cue mode.

In the circuit shown in FIG. 2, the erase signal generator 12, the symmetry varying circuit 13, and the switch 14 are respectively constituted by digital circuits. Inexpensive digital circuits may be used for a circuit part comprising the erase signal generator 12, the symmetry varying circuit 13, and the switch 14, and this circuit part may easily be manufactured in the form of an integrated circuit. Unlike in the conventional cue signal recording circuit described before, it is unnecessary to use an expensive relay switch for the switch 14. It will suffice to use an inexpensive digital switch for the switch 14. In addition, the capacitance of the capacitor $C_1$ may be small in the range of 0.01 $\mu$F, for example, because the signal passing through the capacitor $C_1$ is a high-frequency signal. Therefore, the cue signal recording circuit can be downsized and manufactured at a low cost.

The cue signal is desirable recorded at a recording level of $-6$ dB to $-10$ dB from the saturation level of the tape. According to the present embodiment, the recording level of the cue signal can be varied with ease by approximately varying the duty factors of the pulse signals h and $\bar{h}$.

The cue signal having the frequency of 30 Hz which is recorded on the tape 19, is reproduced from the tape 19 during the cue mode in which the tape 19 is moved at a speed which is higher than that at the time of the recording by a cue signal reproducing head having a construction similar to a conventional cue signal reproducing head. The cue signal is reproduced from the tape 19 with a frequency dependent on the moving speed of the tape 19.

Figure 4:
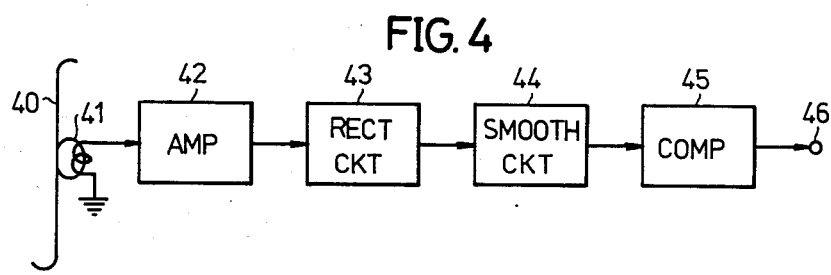
FIG. 4 is a systematic block diagram showing a cue signal reproducing circuit for reproducing a pre-recorded cue signal from a tape which is recorded with the cue signal by the cue signal recording circuit according to the present invention.

Next, a description will be given with respect to a cue signal reproducing circuit for reproducing the pre-recorded cue signal from the tape, by referring to FIG. 4. In FIG. 4, it will be assumed that a cue signal having a frequency of 30 Hz is pre-recorded on a magnetic tape 40 by the cue signal recording circuit according to the present invention. In order to find the beginning of a desired pre-recorded program on the tape 40 by detecting the pre-recorded cue signal, the VTR is set to a fast-forward cue mode or a rewind cue mode in which the tape 40 is moved in the forward or reverse direction at a speed which is higher than that at the time of the recording. Generally, the tape is accommodated within a cassette (not shown), and during a recording or reproducing mode, a tape loading operation is carried out in which operation loading poles (not shown) of the VTR draw the tape out of the cassette and guide the tape so as to make sliding contact with rotary heads (not shown). However, during the cue mode, the tape is not drawn out of the cassette and the tape is moved at the high speed inside the cassette. Accordingly, a cue signal reproducing head must reproduce the pre-recorded cue signal from the tape by making contact with the tape accommodated within the cassette which is loaded into the VTR.

The cue signal reproducing head may be designed to make contact with a magnetic surface of the tape accommodated within the cassette from outside the cassette when the VTR is set to the cue mode. In this case, however, it will be necessary to move the cue signal reproducing head to a receded position every time the tape is drawn out of the cassette so as not to interfere with the tape loading operation. On the other hand, the cassette has an opening on the front thereof for accepting the loading poles. Hence, the cue signal reproducing head is preferably designed to enter inside the cassette through the front opening so as to make contact with a non-magnetic surface (on the opposite side of the magnetic surface) of the tape. Further, the cue signal reproducing head may be built into one of the loading poles.

In FIG. 4, the pre-recorded cue signal reproduced from the tape 40 by a cue signal reproducing head 41, is passed through a reproducing amplifier 42 and is supplied to a rectifying circuit 43 which rectifies the reproduced cue signal. An output signal of the rectifying circuit 43 is supplied to a smoothing circuit 44 wherein the waveform of the signal is smoothened. An output signal of the smoothing circuit 44 is supplied to a comparator 45 wherein the level of the signal is compared with a predetermined level. The comparator 45 produces a cue signal detection signal when the cue signal reproducing head 41 reproduces the pre-recorded cue signal from the tape 40 and the level of the input signal to the comparator 45 becomes greater than the predetermined level. This cue signal detection signal is obtained through an output terminal 46 and is supplied to an operation control circuit (not shown) within the VTR. For example, the operation control circuit automatically changes the mode of the VTR which assumes the cue mode into a reproducing mode so as to start reproduction from the beginning of the desired pre-recorded program, responsive to the cue signal detection signal.

Further, the present invention is not limited to these embodiments, but various variations and modifications may be made without departing from the scope of the present invention.

What is claimed is:

1. A cue signal recording circuit for a magnetic recording and reproducing apparatus, said cue signal recording circuit comprising:

erase signal generating means for generating an erase signal having a relatively high frequency, said erase signal generating means comprising a first digital circuit for generating as said erase signal a first pulse signal having a repetition frequency equal to said relatively high frequency and having a duty factor of approximately 50%;

symmetry varying means responsive to a first external signal having a relatively low frequency for varying the symmetry of the waveform of the output erase signal of said erase signal generating means at said relatively low frequency, said symmetry varying means comprising a second digital circuit for forming second and third pulse signals and for alternately producing said second and third pulse signals at the frequency of said first external signal, said second pulse having a repetition frequency approximately equal to the repetition frequency of said first pulse signal and having a duty factor different from the duty factor of said first pulse signal, said third pulse signal having a repetition frequency approximately equal to the repetition frequency approximately of said first pulse signal and having a duty factor different from said first and second pulse signals;

switching means having a first input terminal applied with the output erase signal of said erase signal generating means and a second input terminal applied with an output signal of said symmetry varying means, said switching means being connected to said second input terminal so as to pass the output signal of said symmetry varying means for a predetermined short time period and being thereafter connected to said first input terminal so as to pass the output erase signal of said erase signal generating means responsive to a second external signal, said switching means comprising a digital switch responsive to said second external signal for selectively passing the output signals of said first and second digital circuits; and erase head means supplied with the output signal of said switching means for recording on a magnetic tape a signal having said relatively low frequency as a cue signal for said predetermined short time period and thereafter erasing pre-recorded signals on said magnetic tape.

2. A cue signal recording circuit as claimed in claim 1 in which said predetermined short time period is approximately equal to one second.

3. A cue signal recording circuit as claimed in claim 1 in which the repetition frequency of the first pulse signal is in the range of 50 kHz to 100 kHz, and said second digital circuit alternately produces said second and third pulse signals at a frequency in the range of 20 Hz to 40 Hz.

4. A cue signal recording circuit as claimed in claim 1 in which said second digital circuit forms said third pulse signal by inverting said second pulse signal.

5. A cue signal recording circuit as claimed in claim 1 which further comprises recording amplifier means having a characteristic for eliminating harmonic components included within the output signal of said switching means.

6. A cue signal recording circuit as claimed in claim 1 in which said first external signal is obtained from a drum servo circuit or a capstan servo circuit within said magnetic recording and reproducing apparatus.

7. A cue signal recording circuit as claimed in claim 1 in which said magnetic recording and reproducing apparatus comprises a recording start button which is manipulated at the start of a recording, and said second external signal is a signal which assumes a high level for approximately one second from a time when said recording start button is manipulated and thereafter assumes a low level.

* * * * *